United States Patent [19]
Gomi et al.

[11] Patent Number: 5,656,349
[45] Date of Patent: Aug. 12, 1997

[54] MAGNETIC DISK, METHOD OF MANUFACTURING THE SAME AND MAGNETIC DISK APPARATUS INCLUDING THE MAGNETIC DISK

[75] Inventors: Kenichi Gomi, Hitachi; Hideaki Tanaka, Katsuta; Hiroyuki Sugimoto; Shoichi Sawahata, both of Hitachi; Masaki Ohura; Yoshihiko Miyake, both of Odawara; Yoshiki Kato, Tokyo; Hiroshi Yashiki; Youichi Inomata, both of Odawara; Yoshihiro Moriguchi, Hiratsuka, all of Japan

[73] Assignee: Hitachi, Ltd., Tokyo, Japan

[21] Appl. No.: 725,772

[22] Filed: Jul. 2, 1991

[30] Foreign Application Priority Data

| Jul. 4, 1990 | [JP] | Japan | 2-175234 |
| Sep. 19, 1990 | [JP] | Japan | 2-247492 |

[51] Int. Cl.$^6$ ................ G11B 5/66; B05D 5/12
[52] U.S. Cl. ......... 428/65.3; 428/65.5; 428/141; 428/694 TP; 428/694 TR; 428/694 BP; 428/694 BR; 428/900; 427/130; 427/131; 427/128; 204/192.1; 204/192.32; 204/192.35
[58] Field of Search .................. 427/130, 131, 427/128; 204/192.1, 192.32, 192.35; 428/65.3, 65.5, 141, 694 TP, 694 TR, 694 BP, 694 BR, 900

[56] References Cited

FOREIGN PATENT DOCUMENTS

| 0130063 | 6/1984 | European Pat. Off. . |
| 0218811 | 7/1986 | European Pat. Off. . |
| 0422640 | 10/1990 | European Pat. Off. . |
| 0422640A2 | 10/1990 | European Pat. Off. . |
| 57-020925 | 2/1982 | Japan . |
| 59-124031 | 7/1984 | Japan . |
| 59-124030 | 7/1984 | Japan . |
| 60-195738 | 10/1985 | Japan . |
| 1134720 | 5/1989 | Japan . |
| 2040130 | 2/1990 | Japan . |
| 02137122 | 5/1990 | Japan . |

OTHER PUBLICATIONS

Japanese Patent Unexamined Publication No. 63–191312.
Japanese Patent Unexamined Publication No. 62–231427.
Japanese Patent Unexamined Publication No. 62–107427.
Japanese Patent Unexamined Publication No. 58–53026.
Japanese Patent Unexamined Publication No. 64–13227.
Japanese Patent Unexamined Publication No. 62–22241.
Japanese Patent Unexamined Publication No. 57–20925.
Japanese Patent Unexamined Publication No. 55–84045.
Japanese Patent Unexamined Publication No. 56–22221.

*Primary Examiner*—Leszek Kiliman
*Attorney, Agent, or Firm*—Antonelli, Terry, Stout & Kraus, LLP

[57] ABSTRACT

A magnetic disk has a magnetic layer and a protective layer disposed on the magnetic layer. A multiplicity of lands having sizes within a predetermined range of sizes and generally equal heights within a predetermined range are formed on the surface of the protective layer at a density within a predetermined range. The lands serve to effectively remove contaminants attached to the floating surface of a magnetic head to ensure a desired sliding reliability and floating stability of the head during a long period of time even in the case of a high-density magnetic disk apparatus in which the extent of floating of the head is small. The reliability with which the magnetic disk apparatus operates is thereby improved. The lands are formed on the surface of the protective layer by a process of forming a mask of fine particles on the protective layer surface and etching the protective layer surface through this mask.

21 Claims, 5 Drawing Sheets

DIRECTION OF ROTATION

MAGNETIC DISK, METHOD OF MANUFACTURING THE SAME AND MAGNETIC DISK APPARATUS INCLUDING THE MAGNETIC DISK

BACKGROUND OF THE INVENTION

This invention relates to a magnetic disk, a method of manufacturing this magnetic disk and a magnetic disk apparatus including this magnetic disk.

The importance of magnetic disk apparatuses used as external storage units of computer systems has become greater in recent years and magnetic disk apparatuses have been improved in recording density year after year. Thin-film magnetic disks, provided as magnetic disks enabling such high-density recording apparatuses, have attracted a great deal of attention. Thin-film magnetic disks have a magnetic thin film instead of the conventional coating type medium formed in such a manner that a magnetic material prepared by mixing and kneading a magnetic powder and a binder is applied to a base.

Generally, thin-film magnetic disks (hereinafter referred to simply as "magnetic disk") with such a magnetic thin film have a structure described below. A base consisting of an aluminum alloy disk and a hard substrative layer formed on this disk is used. If a disk material having a large hardness, e.g., glass or the like, is used instead of an alluminum alloy, the base may be formed without any substrative layer. A magnetic layer is formed on the base. An intermediate layer may be formed between the magnetic layer and the base for the purpose of improving the adhesion therebetween and/or characteristics of the magnetic layer. A protective layer and, if necessary, a lubricating layer are formed on the magnetic disk, thus completing a magnetic disk.

A magnetic recording apparatus includes, as main components, a magnetic disk, a reading/writing magnetic head (hereinafter referred to simply as "head"), a magnetic disk rotating/controlling mechanism, a head positioning mechanism and a circuit for processing a read/write signal. In an ordinary reading/writing method for such a magnetic recording apparatus, the head and the magnetic disk are in contact with each other before the operation is started, but a very small spacing is created between the head and the magnetic disk when the magnetic disk is rotated, and recording or reproduction is performed in this state. To stop the operation, the rotation of the magnetic disk is stopped and the head and the magnetic disk are brought into contact again. This method is called a contact-start/stop method (hereinafter referred to as "CSS method"). For improvement in the recording density of the magnetic recording apparatus, it is preferable to reduce the extent of floating of the head during recording or reproduction. To maintain the desired head floating stability, a higher degree of flatness of the magnetic disk surface is required.

A frictional force caused between the head and the magnetic disk when the operation of the apparatus is started or stopped causes wear on each of the head and the disk, resulting in a deterioration in characteristics. If water or the like exists between the head and the magnetic disk when the magnetic disk is stopped, the head and the magnetic disk strongly attract each other. If the operation is started in such a state, there is a risk of a large force being caused between the head and the magnetic disk and, hence, damage to the head or the magnetic disk. Such frictional and attraction forces become greater as the flatness of the magnetic disk surface is increased, which effect conflicts with the above-mentioned requirement for the head floating stability with respect to the improvement in the recording density.

To reduce the frictional and attraction forces caused between the disk and the head, forming very small irregularities in the disk surface has been proposed. Japanese Patent Unexamined Publication 55-84045 discloses a magnetic disk on which a protective layer having a surface roughness of 20 to 50 nm is formed. Japanese Patent Unexamined Publication 56-22221 discloses a method of forming a protective layer with irregularities by sputtering through a mesh-like shielding plate. Japanese Patent Unexamined Publication 57-20925 discloses a magnetic disk having a protective layer having a surface on which very small projections are formed. Japanese Patent Unexamined Publication 58-53026 discloses a method of forming irregularities in a surface of a protective layer formed on a magnetic disk by irradiating the surface with gas ions. Japanese Patent Unexamined Publication 62-22241 discloses a method of forming irregularities in a surface of a protective layer formed on a magnetic disk by polishing, wet etching or dry etching so that the depth of irregularities is not greater than the thickness of the protective layer.

All these conventional magnetic disk and methods were provided for the purpose of reducing the frictional and attraction forces caused between the magnetic disk and the magnetic head, while the head sliding reliability and the head floating stability during use for a long time were not sufficiently considered.

SUMMARY OF THE INVENTION

An object of the present invention is to provide a magnetic disk apparatus in which the extent of floating of the magnetic head is small and which is capable of maintaining the desired head sliding reliability and head floating stability for a long period of time.

Another object of the present invention is to provide a magnetic disk used in the magnetic disk apparatus to enable maintenance of the desired head sliding reliability and head floating stability for a long period of time.

Still another object of the present invention is to provide a method of forming a magnetic disk having the above features at a low cost.

According to one aspect of the present invention, there is provided a magnetic disk including a base, a magnetic layer laid on the base, and a protective layer laid on the magnetic layer, a surface of the protective layer including a region in which a multiplicity of lands are formed; wherein (a) the lands have generally equal heights ranging from 5 to 40 nm;

(b) the size of the lands is distributed so that some of the lands having a size ranging from 0.1 to 30 µm in equivalent diameter occupy 80% or more of the total number of lands; and (c) the number of lands per unit area in the region ranges from 50 to $2.5 \times 10^5$/mm$^2$.

The magnetic disk in accordance with the present invention has a multiplicity of lands formed in the surface of the protective layer and having features (a), (b) and (c). It has been confirmed that the present invention thereby enables long-term maintenance of the desired sliding reliability and floating stability of the head in a high-recording-density magnetic disk apparatus in which the extent of floating of the magnetic head is small.

The inventors of the present invention have studied in various ways to ascertain causes of reductions in the sliding reliability and the stability of floating of the head, and have found that contaminants are accumulated on the floating surface (called "rail surface" or "slider surface") of the head during operation for a long time to act as a cause of considerably reducing the sliding stability. That is, contaminants attached to the floating surface reduce the stability of the head when the head is floating, and act between the head and the magnetic disk to damage the head and the magnetic disk, thereby imparing the sliding reliability of the magnetic disk apparatus. The deposition of contaminants on the floating surface of the head is promoted if the extent of floating of the head is reduced, in particular, when the floating extent is 0.15 μm or less.

The inventors of the present invention have come to an idea of removing contaminants on the floating surface by forming recesses/projections on the surface of the magnetic disk, have elaborately studied the surface configuration of the magnetic disk and the attachment of contaminants to the floating surface, and have thereby found that contaminants attached to the floating surface can be removed effectively if the recesses/projections formed on a protective surface of the magnetic disk have a particular configuration. Contaminants on the floating surface can be removed by the recesses/projections on the disk surface in such a manner as to be scraped off the floating surface by the projections and moved to positions on the periphery of the projections. The projections function particularly effectively in a case where the magnetic disk and the head slide on each other when the apparatus is started or stopped, or in a case where, even during steady floating, the extent of floating is temporarily reduced due to a seek operation or some disturbance. According to the present invention, it is possible to effectively remove contaminants attached to the floating surface by the effect of the multiplicity of lands formed on the protective layer surface of the magnetic disk and, hence to maintain the desired sliding reliability and floating stability of the head for a long period of time.

Preferably, the heights of the lands formed range from 5 to 40 nm and are substantially uniform in the land formation region of the magnetic disk. It is important to make the lands substantially uniform in height for the purpose of maintaining the initial head floating stability. Making the lands uniform in height is particularly important for effectively removing the above-mentioned contamination on the floating surface. This is because only higher lands located below the floating surface generally function to remove the contamination. If the lands are uniform in height, a greater number of lands can contribute to the removal of the contamination. If the height of the lands is excessively small, the effect of scraping contaminants off the floating surface is reduced and the capacity of the recess between the lands to which the contaminants scraped off are removed is reduced. Since the present invention is provided to be applied to a high-recording-density magnetic disk apparatus in which the extent of floating of the head is restricted, an excessive increase in the height of the lands is undesirable. That is, the overall thickness of the protective layer is correspondingly increased, so that the distance between the head and the magnetic layer of the magnetic disk at the time of reading/writing is increased. To further improve the effect of removing the contamination on the floating surface, it is preferable to set the height of the lands to the range of 10 to 40 nm. To reduce the distance between the head and the magnetic layer, it is preferable set to the height of the lands to the range of 10 to 30 nm.

Preferably, the protective layer includes a thinner portion and thicker portions, and the thicker portions are dispersively disposed in the area of the thinner portion to form the above-described lands. Preferably, each of the thinner portion and the thicker portions is substantially uniform in thickness, and the difference between the thicknesses of the thinner portion and the thicker portions is within the range of 5 to 40 nm. It is thereby possible to form lands uniform in thickness and having a size in the above-mentioned range.

"Lands" of the magnetic disk referred to herein represent portions intentionally formed on the protective layer surface by providing a difference in level in the protective layer surface as described above, excluding fine structures such as grain boundaries formed at the time of formation of the magnetic layer, the intermediate layer and so on in layers below the protective layer, and fine irregularities formed in the magnetic disk surface due to fine scratches, grooves or the like formed in the surfaces of a substrative layer or the base when the same is processed.

Preferably, the multiplicity of lands formed have a size distribution such that some of them having a size ranging from 0.1 to 30 μm occupy 80% or more of the total number of lands. More preferably, there are no lands having a size greater than 30 μm. Since contaminants attached to the floating surface of the head have various shapes and sizes, the land size distribution may be extended to cope with various contaminants. However, if the size of the lands is excessively large, it is difficult to move contaminants scraped off the floating surface to positions on the periphery of the lands, and there is a risk of the contaminants scraped off being caught again between the magnetic disk and the floating surface. If the size of the lands is excessively small, contaminants on the floating surface are scraped so as to be only shifted laterally and tend to remain on the floating surface. Also, if the size of the lands is excessively small, the self-strength of the lands is reduced so that the lands can easily be damaged at the time of contact with the head or scraping off contaminants. Thus, to effectively remove contaminants on the floating surface, it is preferable to set the land size distribution within the above range. To further improve the effect of removing contaminations on the floating surface while sufficiently increasing the strength of the lands, it is more preferable to form the lands so that some of them having a size ranging from 0.2 to 20 μm occupy 80% or more of the total number of lands. Still more preferably, lands having a size ranging from 0.5 to 15 μm occupy 80% or more of the total number of lands. The size of the lands is defined as described below. If each land is generally circular as viewed from right above, the size of the lands is defined as the diameter of the corresponding circle. In the case of a shape other than the circular shape, the size is defined as the diameter (equivalent diameter) of an imaginary circle having the same area as a particular land. For example, if there is a rectangular land having a width of 2 μm and a length of 20 μm, the equivalent diameter is about 7.1 μm.

Preferably, the multiplicity of lands are arranged by suitably selecting the size from the above range so that the number of lands per unit area is within the range of 50 to $2.5 \times 10^5/mm^2$. It is also preferable to form the lands so that the proportion of the total area of lands formed in a region having a unit area to this unit area is within the range of 0.5 to 60%. If the number of lands or the proportion of the total area of the lands is excessively small, there is a possibility that a substantially large portion of the floating surface faces none of the lands depending upon the position of the head, resulting in failure to effectively remove contaminants attached to the floating surface. If the number of lands or the proportion of the total area of the lands is excessively large, it is difficult to move contaminants scraped off the floating surface to the recess around the lands, and there is a risk of the contaminants scraped off being caught again between the magnetic disk and the floating surface. To improve the effect of removing contaminants on the floating surface, it is preferable to arrange the lands so that the number of lands per unit area is within the range of $100/mm^2$ to $1\times10^5/mm^2$. More preferably, the lands are arranged so that the number of lands per unit area is within the range of $200/mm^2$ to $5\times10^4/mm^2$. For further improvement in the effect of removing contaminations on the floating surface, the proportion of the total area of lands formed in a region having a unit area to this unit area is set within the range of, preferably, 1 to 50%, or more preferably, 2 to 40%.

Further, it is preferable to arrange the multiplicity of lands so that the lands are dispersed randomly with a certain distribution of the distance between adjacent pairs of the lands, and so that the average of the above distance is within the range of 1 to 80 μm. It is possible that contaminants will be attached to any portion of the floating surface. To effectively remove them, therefore, it is preferable to randomly disperse the lands with a certain distribution of the distance between the lands, whereby the multiplicity of lands can act generally uniformly on contaminants on any portions of the floating surface to smoothly remove the contaminants. If the average distance between the lands is excessively small, it is difficult to move contaminants scraped off the floating surface to the recess around the lands, and there is a risk of the contaminants removed being caught again between the magnetic disk and the floating surface. If the average distance between the lands is excessively large, the possibility of a substantially large portion of the floating surface facing none of the lands depending upon the position of the head is increased, resulting in failure to effectively removing contaminants attached to the floating surface. Also, if the average distance between the lands is excessively large, there is a possibility of a thinner portion between each pair of adjacent lands being brought into contact with the head, so that the sliding durability is impaired. To improve the effect of removing contaminants on the floating surface while maintaining the desired sliding durability, the average of the distance between the lands is set to the range of, preferably, 2 to 60 μm, or more preferably, 5 to 50 μm. The distance between the lands referred to herein is not defined as the distance between the centers of adjacent two lands but defined as the minimum distance between outer circumferential ends of adjacent two lands.

According to the present invention, lands are formed on the surface of the protective layer of the magnetic disk in conformity with the above numerical ranges, and it is thereby possible to effectively remove contaminants attached to the floating surface of the head and, hence, to maintain the desired sliding durability and floating stability of the head even in the case of a magnetic disk apparatus in which the head floating extent is restricted.

Since in the magnetic disk of the present invention a multiplicity of lands are formed on the surface of the protective layer, the magnetic layer can be flat. It is thereby possible to prevent variations in the reading output due to irregularities in the magnetic layer at the time of reading/writing. Thus, a magnetic disk improved in reading and writing characteristics can be obtained.

According to another aspect of the present invention, there is provided a method of manufacturing a magnetic disk, comprising the steps of:

preparing a base;

forming a magnetic layer on at least one surface of the base;

forming a protective layer on the magnetic layer to obtain a semi-finished piece;

forming a mask of a multiplicity of fine particles on at least a portion of a surface of the protective layer;

etching the surface of the protective layer through the mask to a depth not greater than the thickness of the protective layer; and removing the mask from the protective layer to obtain, on the surface of the protective layer, a multiplicity of lands having size- and distance-distributions and generally equal in height.

According to the method of the present invention, fine particles can be attached to the surface of the protective layer formed generally uniformly in thickness by a simple means such as coating or immersion, and can be used as a mask for etching of the protective layer, thereby enabling a multiplicity of lands uniform in height to be formed on the protective layer surface in conformity with the size and the disposition of the attached particles.

According to the present invention, as described above, a multiplicity of lands having the above-described features are provided on the surface of the protective layer of the magnetic disk to realize a magnetic disk and a magnetic disk apparatus having the following advantages.

First, because the the formed lands are generally uniform in height, the desired head floating stability can be maintained when the extent of head floating is small, e.g., 0.15 μm. Second, contaminants attached to the floating surface of the head during long-term use are effectively removed by the lands of the magnetic disk, and it is thereby possible to maintain the desired sliding durability and floating stability of the head for a long time. Third, since recess/projections are formed on the protective layer surface, variations in the reading output due to irregularities in the magnetic layer can be prevented, thereby obtaining improved reading and writing characteristics.

According to the method of the present invention, fine particles are dispersively attached to the surface of the protective layer of the magnetic disk, the protective layer is etched with the mask formed of these particles to a depth not greater than the thickness of the protective layer, and the fine particles are thereafter removed, thereby forming fine uniform-height lands with accuracy in conformity with the patterns of the fine particles attached to the surface of the protective layer of the magnetic disk. It is thereby possible to manufacture a magnetic disk having the abovedescribed advantages at a reduced cost with improved reproducibility.

The above and other objects, features, and advantages of the present invention will become apparent from the following detailed description of the preferred embodiments of the present invention.

DESCRIPTION OF THE PREFERRED EMBODIMENTS

Figure 1:
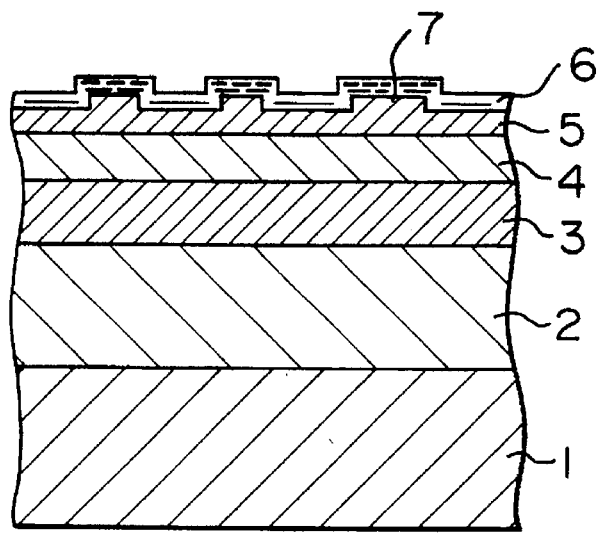
FIG. 1 is an enlarged fragmentary sectional view of a magnetic disk in accordance with an embodiment of the present invention.

Embodiments of the present invention will be described below.

A magnetic disk in accordance with the present invention has a base which may be provided by forming a hard substrative layer of NiP, alumite or the like on a disk formed of an aluminum alloy, forming a disk of glass, ceramic or a hard plastic alone, or by forming a substrative layer on a surface of this disk. A magnetic layer is formed on the base. An intermediate layer may be formed between the magnetic layer and the base for the purpose of improving the adhesion therebetween and/or characteristics of the magnetic layer. Preferably, the magnetic layer is formed of a material having a high saturated magnetic flux density and a large coercive force, for example, a CoNi alloy, a CoCr alloy, or an alloy prepared by adding to each of these alloys at least one of other metallic elements such as Zr, Ta and Pt. It is preferable to form the intermediate layer of a material which improves crystal orientation properties of the magnetic layer. For example, Cr or Cr with an addition of at least one other element is particularly preferred if a Co alloy is used to form the magnetic layer as mentioned above. A protective layer is formed on the surface of the magnetic layer, and a multiplicity of lands are formed on the protective layer by the above-described method. This protective layer may be a layer of C, $SiO_2$, a metal carbide, a metal nitride, a metal oxide or the like formed by sputtering or chemical vapor deposition (CVD). A layer of C is particularly preferred if the producibility and the sliding durability are considered. A lubricating layer is formed on the surface of the protective layer if necessary to complete the magnetic disk. The lubricating layer is formed of, preferably, a fluorine lubricant or, more preferably, a perfluoropolyether lubricant. The thickness of the lubricating layer is, preferably, smaller than the height of the lands formed on the protective layer surface. If the thickness of the lubricating layer is greater than the height of the lands, it is difficult to obtain the desired effect of removing contaminations from the floating surface by the lands.

In the magnetic disk of the present invention, the surface of the base may be substantially flat since a multiplicity of lands are provided for removing contaminants attached to the floating surface of the head. Accordingly, the magnetic layer formed on the base is made flat to prevent variations in the reading output due to the influence of irregularities in the magnetic layer at the time of reading/writing, thereby making it possible to obtain a magnetic disk having improved reading/writing characteristics. The present invention also includes a magnetic disk in which suitable very small irregularities whose difference in level is smaller than the height of the lands, e.g., fine grooves extending in the circumferential direction, are formed in the surface of the base for the purpose of controlling the orientation of the magnetic layer.

Next, a method of manufacturing a magnetic disk in accordance with the present invention will be described below. The inventors of the present invention have studied various methods for manufacturing practical and economical magnetic disks, and have found that the desired magnetic disk can be obtained by a method of forming a multiplicity of lands on the surface of the protective layer of the magnetic disk based on dispersively attaching a multiplicity of solid particles to the surface of the protective layer of the magnetic disk, etching the protective layer to a depth smaller than the thickness thereof by using the particles as a mask, and thereafter removing the solid particles.

Figure 3:
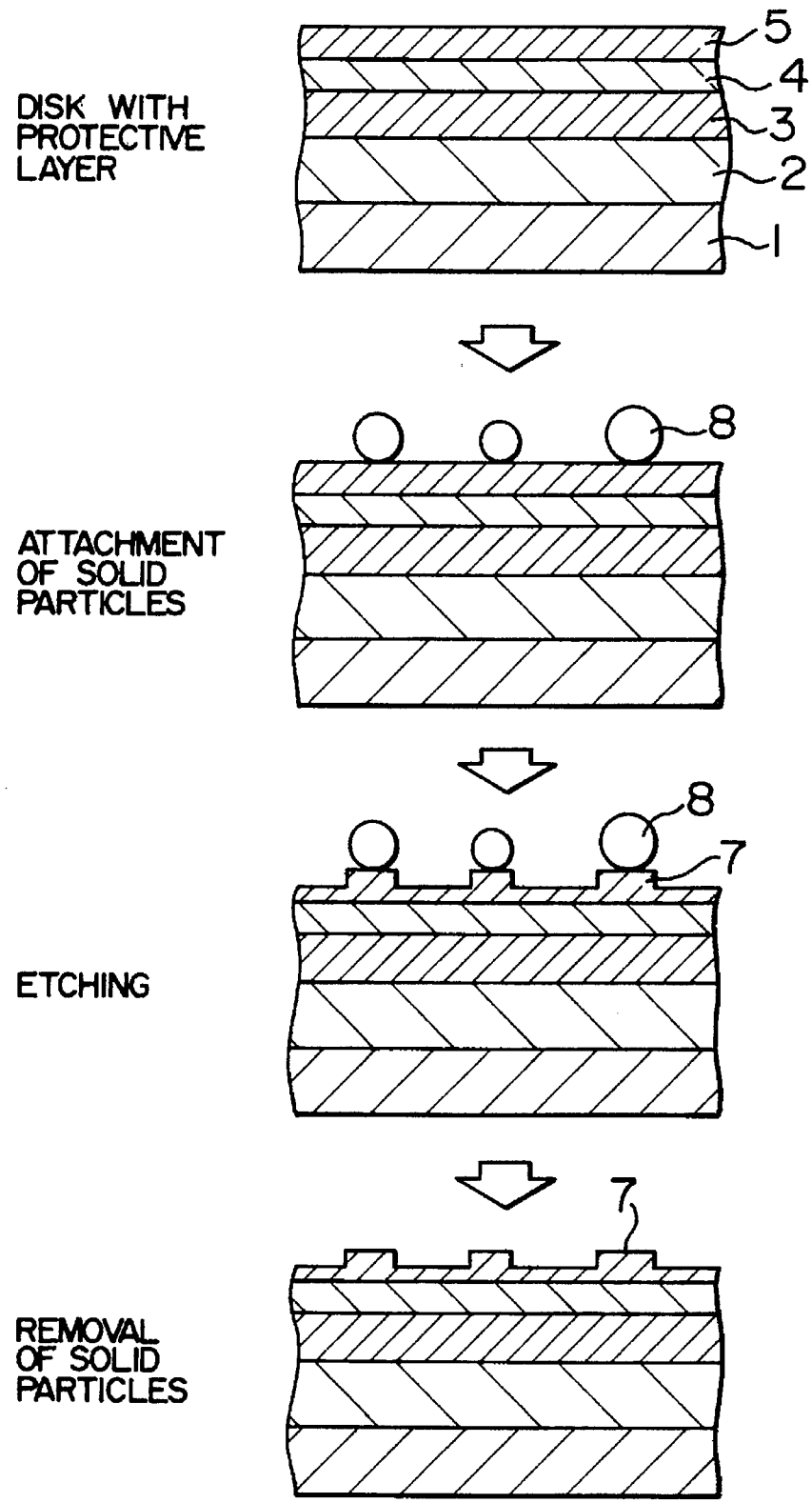
FIG. 3 includes enlarged fragmentary sectional views corresponding to the steps of forming lands on the surface of the protective layer of the magnetic disk shown in FIG. 1.

FIG. 3 shows an example of the magnetic disk manufacturing method of the present invention. The etching method used in this example can be selected according to the material of the protective layer 5 from dry etching methods including ion beam etching, reverse sputtering or plasma etching, and wet etching methods using an etching solution. Preferably, a particular etching method such that the speed of etching of protective layer portions to which no solid particle 8 is attached is generally constant within the area of the magnetic disk surface is selected in order to make resulting lands generally equal in height. A multiplicity of lands 7 having generally equal heights within the above-mentioned desired numerical range can thereby be formed with accuracy on the surface of the protective layer 5 of the magnetic disk.

According to the present invention, as shown in. FIG. 3, lands 7 are formed by etching using solid particles 8 attached to the surface of the protective layer 5 as a mask, and it is therefore important whether or not the etching method provides a directionality. In a case where an etching method which provides no directionality and which allows a substantially large extension of the etched area into the region at the back of the solid particles, e.g., plasma etching or wet etching, is used, the size of lands 7 formed is smaller than that of solid particles 8 and it is difficult to control the size of lands 7. In contrast, in a case where an etching method which provides directionality, e.g., ion etching or reverse sputtering, is used, the size of lands 7 is substantially equal to that of solid particles 8 and it is possible to control the size of resulting lands 7 according to the size of solid particles 8 attached to the etched surface. An etching method which provides directionality is therefore preferred. For such an etching method, it is preferable to set an etching direction generally perpendicular to the magnetic disk surface. Ion beam etching is most preferable in terms of strictness of directionality. In practice, however, there is no problem even if the directionality is not so strong and reverse sputtering is more preferable in terms of mass-productivity. If a layer of C is used as the protective layer, it is more preferable to use reverse sputtering in an atmosphere containing oxygen. If lands 7 are formed in this manner, the outermost surface portion of the C layer is improved in quality by the effect of oxygen, so that the strength of attachment of the lubricating layer formed thereon can also be improved.

Figure 4:
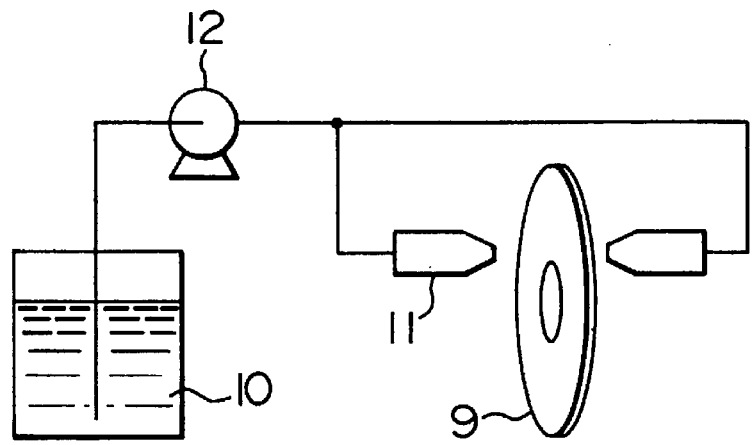
FIG. 4 is a schematic diagram of an example of an apparatus for attaching solid particles to the surface of the protective layer of the disk based on the process shown in FIG. 3.
Figure 5:
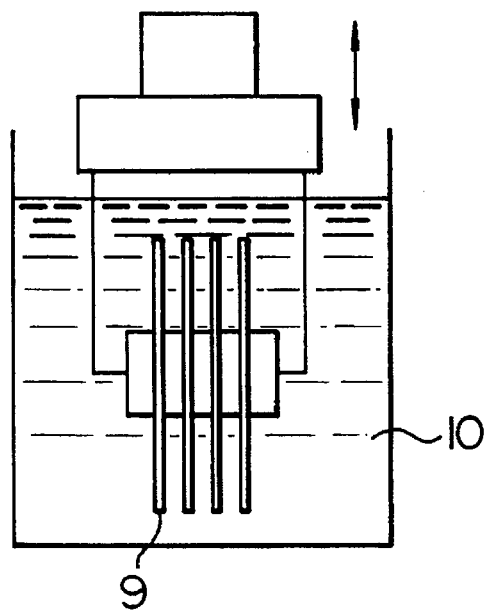
FIG. 5 is a schematic diagram of another example of the apparatus for attaching solid particles to the surface of the protective layer of the disk.

According to the present invention, a most practical example of the method of dispersively attaching solid particles 8 to the protective layer surface is a method in which a suspension 10 prepared by dispersing solid particles 8 in a suitable liquid is applied to the surface of the protective layer 5 of the magnetic disk 9 by a spin coating method or spray coating method using an apparatus such as that shown in FIG. 4 (having a pump 12 and a nozzle 11), or by an immersion method using an apparatus such as that shown in FIG. 5, and the liquid is thereafter evaporated. The liquid used in this method is, preferably, a liquid which leaves no residuum after being evaporated, for example, pure water, a high-purity fluorine solvent or an organic solvent. According to the present invention, with respect to the method of dispersively attaching solid particles, it is possible to freely control the density of solid particles attached to the protective layer surface by selecting the density of solid particles in the suspension and the attachment conditions. The desired attachment density mentioned above can thereby be achieved easily. Other attachment methods can also be used. For example, solid particles may be transported by using a gas to be dispersed and attached directly to the surface of the protective layer surface of the magnetic disk. In this case, solid particles may be suitably charged electrically to improve the efficiency of attachment to the protective layer surface. Further, a method may also be used in which a solvent in which the material of fine particles is dissolved is sprayed on the surface of the disk protective layer and the solvent is thereafter evaporated to form a mask of solid particles on the protective layer surface.

According to the present invention, it is important to select or control the height, the size and the arrangement of lands. Among these three factors, the height can be controlled by adjusting the etching time, and the size can be controlled by selecting the particle size (grain size) distribution of fine particles to be used. The land arrangement can be controlled by changing the conditions for attachment of fine particles. The attachment conditions include the following quantities or factors: the density of particles in the suspension, the rate of ejection per unit time through the nozzle, the disk rotation speed, and other factors in the case of a spin coating method; the amount of solution applied by spraying, the spraying time, and other factors in the case of a spray coating method; or the speed at which the immersed disk is lifted and other factors in the case of an immersion method.

It is necessary to select the material of solid particles 8 used in this embodiment of the present invention from materials having characteristics satisfying conditions that:
(1) in the case of dispersively attaching the solid particles to the surface of the protective layer 5 by using a suspension, solid particles are not dissolved or eluted;
(2) the material is difficult to decompose and change in quality by etching; and
(3) the particles can easily be removed from the protective layer surface after etching.

The characteristic (1) is necessary for preventing generation of any unnecessary residuum when the liquid is evaporated. The characteristic (2) is necessary for preventing products generated by decomposing or changing the quality of the solid particles particles by etching from attaching to the protective layer surface. An evaporation residuum or a decomposition or degradation product left on the protective layer surface increases the total amount of contaminations on the head floating surface. The characteristic (3) is particularly important because if solid particles 8 are finally left on the protective layer surface, the stability of floating of the head is reduced.

The inventors of the present invention have searched for materials satisfying these conditions and have found that a material containing at least fluorine and carbon or a fluorine-containing resin is most preferable. More specifically, polytetrafluoroethylene, polychlorotrifluoroethylene, a copolymer of tetrafluoroethylene and perfluorovinylether, graphite fluoride, and derivatives of these compounds are particularly preferred. These materials satisfy the above conditions (1) and (2) because they are very chemically stable and have high chemical resistance and high resistance to plasmas. Each of these materials has a very small surface energy and therefore has a small force for attachment to a different solid material such as to be easily removed by a simple means such as washing, thus also satisfying the condition (3). However, the material of the solid particles in accordance with the present invention is not limited to the above materials, and it may be selected from other organic and inorganic materials satisfying the above conditions (1), (2), and (3) with respect to the solution selected to prepare the suspension and the etching method selected to form lands.

It is necessary to select the size of solid particles 8 used in the present invention according to the etching method so that the size of lands 7 formed on the surface of the protective layer is within the above-mentioned range. In the case of an etching method, such as reverse sputtering or ion beam etching mentioned above, which provides a certain directionality, the size of lands 7 can be substantially equal to that of solid particles 8 and, therefore, solid particles 8 having the same size as lands 7 to be formed may be used, and the control of the size of lands 7 is therefore easier. In a case where an etching method, such as plasma etching or wet etching, which provides no directionality and which allows a substantially large extension of the etched area into the region at the back of each solid particle 8 is used, it is necessary to increase the size of solid particle 8 relative to that of lands 7 by considering the extension of the etched area. According to the result of an examination made by the inventors, if the size of solid particles 8 is too small, they tend to cohere, become difficult to dispersively attach to the surface of the protective layer 5 and difficult to remove from the same after the attachment. Therefore the minimum particle size of solid particles used is preferably 0.1 µm or greater, more preferably, 0.2 µm or greater, or still more preferably, 0.5 µm. While the upper limit of the size of solid particles 8 used is determined by the upper limit of the size of lands 7 to be formed, the maximum particle size is preferably 30 µm or smaller. More preferably, the maximum particle size is 25 µm or smaller. If the particle size is too large, the particles attached to the surface of the protective layer 5 tend to be easily dismounted therefrom by a small shock. The solid particles 8 shown in FIG. 3 have a spherical shape but, needless to say, such spherical particles are not exclusively required for the present invention.

As described above, the size of lands 7 formed on the surface of the protective layer 5 and the spacing between the lands 7 can be controlled according to the size of solid particles 8 used and the attachment method. It is thereby possible to form lands 7 with accuracy so that the number of lands per unit area on the magnetic disk surface and the proportion of the total area of lands 7 formed in a region having a unit area to this unit area are determined within the above-mentioned ranges.

In the protective layer 5 having a surface on which lands 7 are formed by the above-described method, the material of the layer is, preferably, homogenous with respect to the land portions and the other portions. If the portions forming protective layer lands 7 are formed of a material different from the material of the other portions, the land portions and the other portions are easy to separate from each other at the interface between them when the protective layer 5 and the head slide relatively on each other, and the sliding durability is therefore reduced. However, if two suitable materials having excellent adhesive properties can be selected, the protective layer 5 may include such different materials. For example, the protective layer 5 may be formed in such a manner that a material which is not etched by the selected etching method is formed as a lower layer of the protective layer 5, while a material which can be etched is formed as an upper layer. In this case, since only the upper layer is etched by the etching for forming lands on the surface of the protective layer 5, lands having a height corresponding to the thickness of the upper layer of the protective layer can be formed uniformly with accuracy, and it is easy to control the height of the lands.

The present invention has been described mainly with respect to application to a CSS type magnetic disk apparatus. However, the improved effect of removing contaminations from the head floating surface by a multiplicity of lands 7 formed on the protective layer surface of the magnetic disk in accordance with the present invention can also be exhibited even when the invention is applied to a load/unload type magnetic disk apparatus having a mechanism for moving the head and the magnetic disk away from each other when the apparatus is stopped or to a contact type magnetic disk apparatus in which the head is not substantially floated during reading/writing.

In the case of a load/unload type magnetic disk apparatus, as well as in the case of a CSS type magnetic disk apparatus, it is possible that the floating stability and the durability will be reduced during long-term use by the attachment of contaminants to the head floating surface. The magnetic disk apparatus of this type can also be improved in head floating stability and durability during long-term use, if the magnetic disk of the present invention is used in which a multiplicity of lands 7 are formed on the surface of the protective layer 5 as described above.

To maintain the desired head floating stability in CSS type and load/unload type magnetic disk apparatuses which perform reading/writing by setting the extent of head floating to the range of 0.01 to 0.15 µm, the number of lands formed on the surface of the protective layer 5 of the magnetic disk with respect to the whole area of the floating surface of the head is set to the range of 50 to $2.5 \times 10^5$/mm$^2$, more preferably, 100 to $1 \times 10^5$/mm$^2$, or still more preferably, 200 to $5 \times 10^4$/mm$^2$. Also, the proportion of the total area of lands formed on the protective layer surface of the magnetic disk within the same area as the floating surface to the total area of the floating surface is preferably 0.1 to 60%, more preferably, 1 to 50%, or still more preferably, 2 to 40%. Also, the average of the distances between adjacent pairs of lands is preferably smaller than the average of the width of the head floating surface, more preferably, ½ of the average width of the floating surface, or still more preferably, ⅓ of the average width of the floating surface. If the number of lands or the proportion of the land area is excessively small, or if the distance between the lands is excessively large, the variation in the extent of head floating is increased even when the floating surface is not substantially contaminated.

For contact-type magnetic disk apparatuses, it is most important to prevent the head or the magnetic disk being damaged by contact-sliding. If a magnetic disk having a multiplicity of lands formed as described above in accordance with the present invention is used, contaminants attached to the sliding surface of the head can be removed instantly. It is thereby possible to prevent the head or the magnetic disk from being damaged by contaminations between the head and the magnetic disk and, hence, to obtain a magnetic disk apparatus improved in long-term sliding reliability. With respect to contact-type magnetic disk apparatuses, however, it is not necessary to consider the head floating stability and, the height of lands formed on the protective layer surface may therefore exceed the above-mentioned range according to other conditions. For example, the upper limit of the height of lands may be set to 60 nm. Increasing the height of lands facilitates the prevention of damage to the magnetic disk due to wear caused by sliding and the removal of contaminants scraped off the sliding surface to positions on the peripheries of lands. To ensure a desired degree of head traveling stability in a contact-type magnetic disk apparatus using a head having a sliding surface, the number of lands formed on the surface of the protective layer of the magnetic disk with respect to the whole area of the sliding surface of the head is set to the range of 50 to $2.5 \times 10^5$/mm$^2$, more preferably, 100 to $1 \times 10^5$/mm$^2$, or still more preferably, 200 to $5 \times 10^4$/mm$^2$. Also, the proportion of the total area of lands formed on the protective layer surface of the magnetic disk to the area of the sliding surface is preferably 0.1 to 60%, more preferably, 1 to 50%, or still more preferably, 2 to 40%. Also, the average of the distances between adjacent pairs of lands is preferably smaller than the average of the width of the head sliding surface, more preferably, ½ of the average width of the sliding surface, or still more preferably, ⅓ of the average width of the sliding surface. If the number of lands or the proportion of the land area is excessively small, or if the distance between the lands is excessively large, the variation in the extent of head sliding is increased even when the sliding surface is not substantially contaminated.

Figure 6:
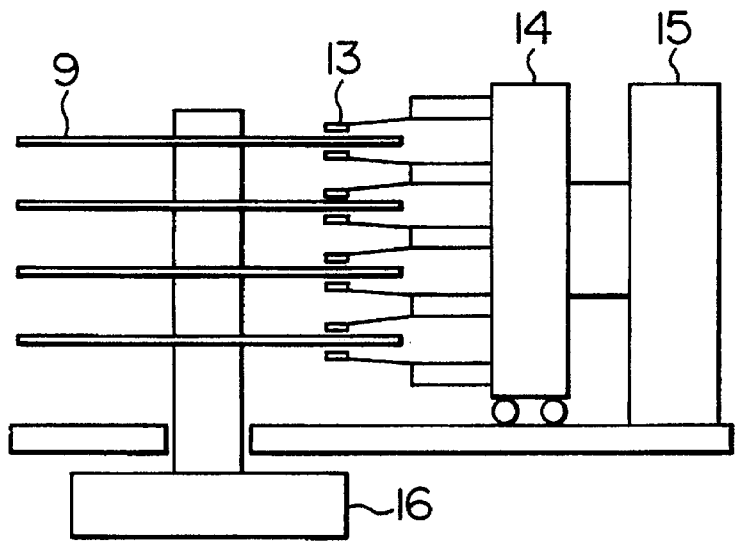
FIG. 6 is a schematic side view of a magnetic disk apparatus incorporating the magnetic disk of the present invention.

FIG. 6 schematically shows the construction of a magnetic disk apparatus in accordance with the present invention. A magnetic disk 9 is attached to a spindle motor 16 provided as a means for rotating the magnetic disk 9. A magnetic head 13 is mounted on a carriage 14 and a voice coil motor 15 constituting a means for positioning the magnetic head 13.

Figure 7:
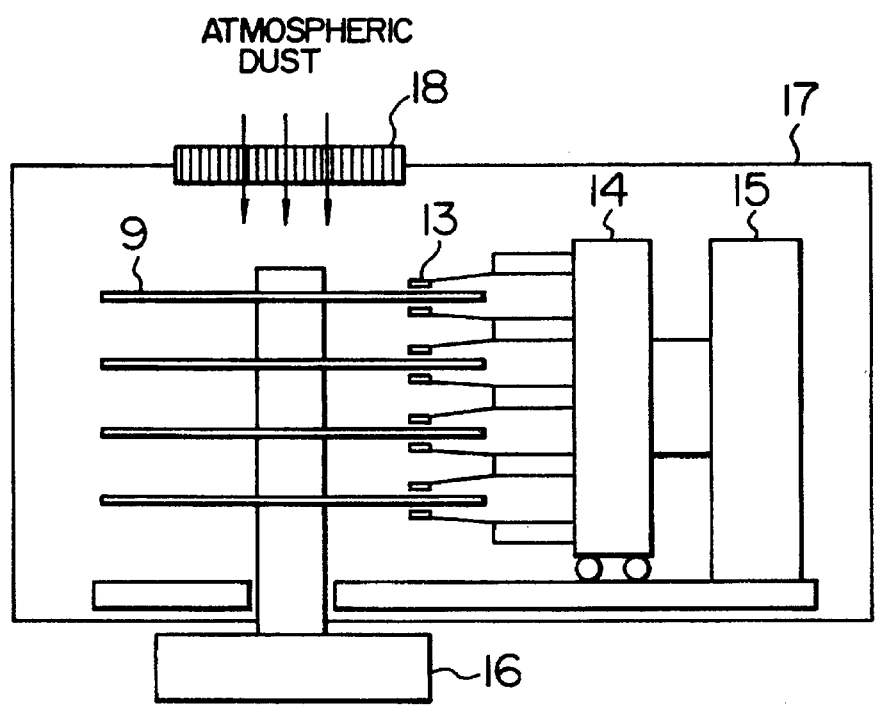
FIG. 7 is a schematic side view of an apparatus used to evaluate the amount of contaminants attached to the floating surface of the magnetic head of the magnetic disk apparatus shown in FIG. 6.

To confirm the effect of the present invention, the attachment of contaminants to the head floating surface during the operation of the magnetic disk apparatus for a long period of time was evaluated in an accelerated manner by the following process. FIG. 7 schematically shows an apparatus used for this evaluation. A sample magnetic disk 9 was set on a spindle motor 16, and a head 13 was set on a carriage 14 connected to a voice coil motor 15, thus constructing a CSS-type magnetic disk apparatus. This magnetic disk apparatus was housed in a case 17 to which a 0.1 µm filter 18 was attached, the whole unit was subjected to an ordinary atmospheric environment, and atmospheric dust having a particle size of 0.1 µm or less was introduced into the case 17 through the filter 18. Under these conditions, the apparatus was operated for 100 hours by rotating magnetic disk 9 at 3,600 rpm and operating the head 13 to seek between the innermost and outermost circumferences in 10 sec cycles. The floating surface of the head 13 was observed after this test operation to relatively evaluate the amount of attached contaminants. The area of the floating surface of the head 13 was about 2 mm and the extent of floating of the head 13 during the ordinary rotation was 0.08 µm at the innermost circumference.

Figure 8:
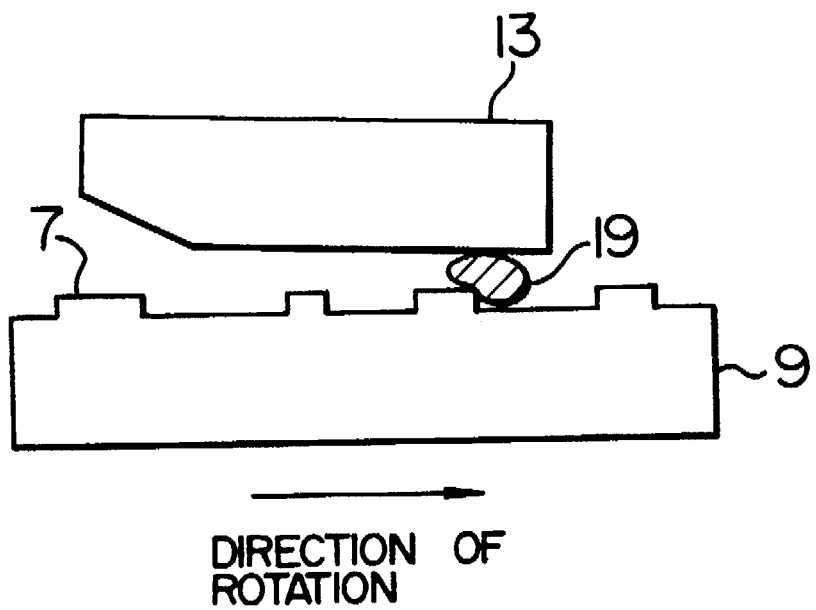
FIG. 8 is a schematic diagram of the effect of removing contaminants on the head floating surface by the lands formed on the surface of the magnetic disk of the present invention.

FIG. 8 shows the effect of removing a contamination 19 on the floating surface of the head 13 with a multiplicity of lands 7 formed on the surface of the magnetic disk 9.

Figure 2:
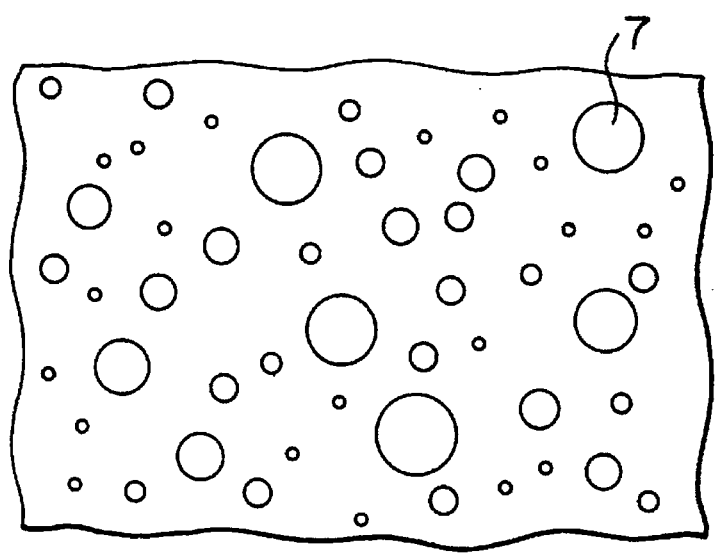
FIG. 2 is a schematic enlarged plan view of a portion of the magnetic disk shown in FIG. 1.

The height and the size of the multiplicity of lands 7 formed on the protective layer surface of the magnetic disk, the distance between lands 7 and the arrangement of lands 7 in accordance with the present invention can be measured by the following means. The height of lands 7 can be measured by a surface contour measuring apparatus having a resolution on the nanometer in the direction of height, such as a two-dimensional or three-dimensional tracer-type surface roughness tester, a three-dimensional optical surface roughness tester, a scanning tunnel electron microscope, or an atomic force microscope. The size of lands 7, the distance between lands 7, the number per unit area and the proportion of the area of lands 7 can be measured by using one of these surface contour measuring means capable of three-dimensional measurement. However, since the lateral measurable area range of each of these measuring means is ordinarily small, it is preferable to use, for measurement of the number of lands per unit area and the area proportion in particular, a method of measuring at a multiplicity of points in the vicinity of one position so that the total measured area is about 1 mm$^2$ and obtaining the average of the measured values. In a case where the protective layer 5 is formed of a material having a comparatively dark color, e.g., carbon, the size, the distance, the number per unit area and the proportion of the area of lands 7 can be measured by a simpler means. That is, since the thickness of the protective layer 5 varies with respect to the portions corresponding to lands 7 and the other portions according to the present invention, the portions corresponding to lands 7 and the other portions differ from each other in contrast of a color if the protective layer is formed of a colored material. The portions corresponding to lands 7 can be discriminated with accuracy by observation with even an optical microscope, for example. The results of observation using an optical microscope may be analyzed by image processing or the like, thereby measuring the size, the distance, the number per unit area and the proportion of the area of lands in a simpler manner. FIG. 2 schematically shows an example of the arrangement of lands on the magnetic disk of the present invention observed with an optical microscope.

The formation of a multiplicity of lands 7 on the protective layer 5 surface for removing contaminants attached to the head has been described above. Alternatively, similar lands may be formed on a base surface by the same method of the invention as that described above, and other layers including a magnetic layer and a protective layer uniform in thicknesses may be formed on the lands or the base surface. Needless to say, recesses or projections thereby formed on the surface of the magnetic disk have substantially the same shape as that described above and the same head contamination removing effect of the invention can be achieved. In this case, however, the magnetic layer is not flat and the above-mentioned effect of preventing variations in reproduction output due to irregularities in the magnetic layer cannot be obtained.

Examples of the present invention will be described below in detail.

EXAMPLE 1

As shown in FIG. 1, a substrative layer 2 of NiP having a thickness of 15 µm was formed by electroless plating on a surface of a disk 1 formed of aluminum and having an outside diameter of 5.25 inches. The substrative layer 2 was thereafter polished until its thickness was reduced to 10 µm to obtain a specular surface having an average roughness (Ra) of 2 nm or less and a maximum roughness (Rmax) of 5 nm or less measured with a tracer type surface roughness tester, thereby forming a base. An intermediate layer 3 of Cr having a thickness of 100 nm, a magnetic layer 4 of CoNi having a thickness of 50 nm and a protective layer 5 of C having a thickness of 30 nm were formed on this base by sputtering. Lands 7 were formed on the surface of the protective layer 5 of C by the following process.

The process of forming lands 7 on the surface of the protective layer 5 will be described below with reference to FIGS. 3 and 4. A suspension 10 was prepared by ultrasonically dispersing 1% by weight of particles 8 of polytetrafluoroethylene (PTFE) having an average particle size of 5 µm in a fluorine solvent and was applied to the surface of the protective layer 5 of C by spin coating using pump 12 and nozzle 11. Then the solvent was evaporated to dispersively attach PTFE particles 8 to the surface of the protective layer 5. The state of attachment of PTFE particles 8 was observed with an optical microscope and it was thereby found that 90% or more of the total number of attached particles 8 had a size of 1 to 10 µm, the average of the distance between adjacent pairs of particles 8 was about 15 µm, the number of attached particles 8 per unit area was about 2,500/mm$^2$, and the proportion of the total area of particles 8 attached portions to the unit area was about 5%. Next, this disk was processed by a sputtering apparatus in an Ar atmosphere containing 10% of oxygen in a reverse sputtering manner so that the protective layer 5 was etched to a depth of 15 nm at positions where there were no PTFE particles 8. Thereafter, the etched surface was scrubbed with pure water to remove PTFE particles 8. The states of the surface before and after the etching were observed and it was thereby confirmed that lands 7 having substantially the same size as attached particles 8 were formed on the surface of the protective layer 5. The average of the distance between adjacent pairs of lands 7 after the etching was about 15 µm, the number of lands 7 per unit area was about 2,500/mm$^2$, and the proportion of the total area of lands 7 to the area of the region in which lands 7 were formed was about 5%. The height of lands 7 was measured with the tracer type surface roughness tester and it was thereby confirmed that the height of each land 7 was about 15 nm.

A layer 6 of a perfluoropolyether lubricant having a thickness of about 5 nm was formed on the surface of the thus-formed disk by applying the material thereto, thereby completing a magnetic disk 9 as shown in FIG. 1.

The guaranteed minimum extent of floating of the head 13 (FIG. 6) from the magnetic disk 9 manufactured in accordance with this example was 0.04 µm or smaller, thereby making it possible to obtain a magnetic disk apparatus having a high degree of reliability with respect to even a head 13 floating extent of 0.08 µm. The magnetic disk 9 manufactured in accordance with this example was tested with respect to a CSS operation by using the apparatus of FIG. 6. As a result, no damage to the disk surface was observed even after 50,000 CSS cycles, and it was confirmed that the disk had improved long-term sliding reliability. The guaranteed minimum extent of floating of the head 13 after the CSS test was also 0.04 µm. No substantial change was observed in the floating surface of the head 13 in comparison with the state before the test. Consequently, it was confirmed that the magnetic disk 9 of this example had an effect of preventing attachment of contaminants to the head 13 was capable of maintaining the desired sliding reliability and head floating stability during long-term use.

EXAMPLE 2

A magnetic disk 9 was manufactured in the same manner as Example 1 except that a suspension 10 was prepared by ultrasonically dispersing 0.2% by weight of the same PTFE particles 8 as those used in Example 1 in a fluorine solvent. The size of lands 7 of the magnetic disk 9 in accordance with this example was substantially the same as Example 1, the average of the distance between adjacent pairs of lands 7 was about 40 µm, the number of lands 7 per unit area was about 500/mm², and the proportion of the total area of lands 7 was about 1%. The height of lands 7 was measured with the tracer type surface roughness tester and it was confirmed that the height of each land 7 was about 15 nm.

The magnetic disk 9 in accordance with this example was tested with respect to the CSS operation. It was thereby confirmed that, as in the case of Example 1, the magnetic disk was excellent with respect to both the result of measurement of the head floating characteristics and the result of observation of contaminations on the floating surface of the head, and was capable of maintaining the desired sliding reliability and head floating stability during long-term use.

EXAMPLE 3

A magnetic disk 9 was manufactured in the same manner as Example 1 except that suspension 10 was prepared by ultrasonically dispersing 4% by weight of the same PTFE particles 8 as those used in Example 1 in a fluorine solvent. The size of lands 7 of the magnetic disk 9 in accordance with this example was substantially the same as Example 1, the average of the distance between adjacent pairs of lands 7 was about 5 μm, the number of lands 7 per unit area was about 10,000/mm², and the proportion of the total area of lands 7 was about 20%. The height of lands 7 was measured with the tracer type surface .roughness tester and it was confirmed that the height of each land 7 was about 15 nm.

The magnetic disk 9 in accordance with this example was tested with respect to the CSS operation. It was thereby confirmed that, as in the case of Example 1, the magnetic disk was excellent with respect to both the result of measurement of the head floating characteristics and the result of observation of contaminations on the floating surface of the head, and was capable of maintaining the desired sliding reliability and head floating stability during long-term use.

EXAMPLE 4

A magnetic disk 9 was manufactured in the same manner as Example 1 except that suspension 10 was prepared by ultrasonically dispersing 1% by weight of the same PTFE particles 8 as those used in Example 1 in a fluorine solvent and was applied to the surface of the protective layer 5 of C by an immersion method with the apparatus of FIG. 5. The size of lands 7 of the magnetic disk 9 in accordance with this example was substantially the same as Example 1, the average of the distance between adjacent pairs of lands 7 was about 15 μm, the number of lands 7 per unit area was about 2,500/mm², and the proportion of the total area of lands 7 was about 5%. The height of lands 7 was measured with the tracer type surface roughness tester and it was confirmed that the height of each land 7 was about 15 nm.

The magnetic disk 9 in accordance with this example was tested with respect to the CSS operation. It was thereby confirmed that, as in the case of Example 1, the magnetic disk was excellent with respect to both the result of measurement of the head floating characteristics and the result of observation of contaminations on the floating surface of the head, and was capable of maintaining the desired sliding reliability and head floating stability during long-term use.

EXAMPLE 5

A magnetic disk 9 was manufactured in the same manner as Example 1 except that protective layer 5 was formed by plasma CVD using a gas of a mixture of methane and hydrogen to have a thickness of 30 nm. The size of lands 7 of the magnetic disk 9 in accordance with this example was substantially the same as Example 1, the average of the distance between adjacent pairs of lands 7 was about 15 μm, the number of lands 7 per unit area was about 2,500/mm², and the proportion of the total area of lands 7 was about 5%. The height of lands 7 was measured with the tracer type surface roughness tester and it was confirmed that the height of each land 7 was about 15 nm.

The magnetic disk 9 in accordance with this example was tested with respect to the CSS operation. It was thereby confirmed that, as in the case of Example 1, the magnetic disk was excellent with respect to both the result of measurement of the head floating characteristics and the result of observation of contaminations on the floating surface of the head, and was capable of maintaining the desired sliding reliability and head floating stability during long-term use.

EXAMPLE 6

An substrative layer 2 of NiP, an intermediate layer 3 of Cr, a magnetic layer 4 of CoNi were formed in the same manner as Example 1. A lower protective layer 5' of SiC having a thickness of 15 nm and an upper protective layer 5" of C having a thickness of 15 nm were formed thereon by sputtering. Lands 7 were formed on the surface of the two-layer protective layer 5 consisting of the layers 5' and 5" of C in the same manner as Example 1. According to the etching conditions of this example, since the etching rate of Sic is smaller than that of C, the height of lands 7 formed is not substantially changed from 15 nm corresponding to the thickness of the upper protective layer 5" of C even if the etching time is increased to some extent, and it is therefore possible to control the height of lands 7. In this example, a lubricating layer 6 was formed on the surface of the protective layer 5 on which lands 7 were formed, as in the case of Example 1, thus completing a magnetic disk 9. The size of lands 7 of the magnetic disk 9 in accordance with this example was substantially the same as Example 1, the average of the distance between adjacent pairs of lands 7 was about 15 μm, the number of lands 7 per unit area was about 2,500/mm², and the proportion of the total area of lands 7 was about 5%. The height of lands 7 was measured with the tracer type surface roughness tester and it was confirmed that the height of each land 7 was about 15 nm.

The magnetic disk 9 in accordance with this example was tested with respect to the CSS operation. It was thereby confirmed that, as in the case of Example 1, the magnetic disk was excellent with respect to both the result of measurement of the head floating characteristics and the result of observation of contaminations on the floating surface of the head, and was capable of maintaining the desired sliding reliability and head floating stability during long-term use.

EXAMPLE 7

Base 1 was formed of a glass base formed by working so as to have a specular surface having an average roughness (Ra) of 1.5 nm or less and a maximum roughness (Rmax) of 4 nm or less measured with the tracer type surface roughness tester. An intermediate layer 3 of Cr having a thickness of 100 nm, a magnetic layer 4 of CoNi having a thickness of 50 nm, and a protective layer 5 of C having a thickness of 30 nm were formed on this base by sputtering in the same manner as Example 1. Lands 7 were formed on the surface of the protective layer 5 of C in the same manner as Example 1. A lubricating layer 6 was formed on lands 7. A magnetic disk 9 was thus manufactured. The size of lands 7 of the magnetic disk 9 in accordance with this example was substantially the same as Example 1, the average of the distance between adjacent pairs of lands 7 was about 15 μm, the number of lands 7 per unit area was about 2,500/mm², and the proportion of the total area of lands 7 was about 5%. The height of lands 7 was measured with the tracer type surface roughness tester and it was confirmed that the height of each land 7 was about 15 nm.

The magnetic disk 9 in accordance with this example was tested with respect to the CSS operation. It was thereby confirmed that, as in the case of Example 1, the magnetic disk was excellent with respect to both the result of measurement of the head floating characteristics and the result of observation of contaminations on the floating surface of the head, and was capable of maintaining the desired sliding reliability and head floating stability during long-term use.

COMPARATIVE EXAMPLE 1

A substrative layer 2 of NiP having a thickness of 15 μm was formed by electroless plating on a surface of an aluminum disk 1 having an outside diameter of 5.25 inches, and was thereafter polished until its thickness was reduced to 10 μm to obtain a specular surface having an average roughness (Ra) of 2 nm or less and a maximum roughness (Rmax) of 5 nm or less measured with a tracer type surface roughness tester, thereby forming a base in the same manner as Example 1. An intermediate layer 3 of Cr having a thickness of 100 nm, a magnetic layer 4 of CoNi having a thickness of 50 nm, and a protective layer 5 of C having a thickness of 30 nm were formed on this base by sputtering. In this comparative example, no lands 7 were formed on the surface of the protective layer 5, and a lubricating layer 6 was directly formed on the protective layer 5, thus manufacturing a magnetic disk 9.

The guaranteed minimum extent of floating of the head 13 from the magnetic disk 9 manufactured in accordance with this comparative example was 0.04 μm or smaller, thereby making it possible to design a magnetic disk apparatus with a head 13 floating extent of 0.08 μm. However, as a result of the CSS test of the magnetic disk 9 manufactured in accordance with this comparative example, which test was performed by using the apparatus of FIG. 6, the disk surface was damaged during 10,000 CSS cycles. The sliding reliability of this magnetic disk was thus poor. The guaranteed minimum floating extent of the head 13 was measured with respect to another magnetic disk 9 manufactured in the same manner and operated through 5,000 CSS cycles. The minimum floating extent thereby measured was only 0.1 μm. The floating surface of the head 13 was observed to find that a contamination which was not seen before the test operation and which was regarded as a cause of the deterioration of the floating characteristic was attached to the floating surface. It was thereby found that the magnetic disk 9 in accordance with this comparative example was incapable of maintaining the desired sliding reliability and head floating stability during long-term use.

COMPARATIVE EXAMPLE 2

A substrative layer 2 of NiP having a thickness of 15 μm was formed by electroless plating on a surface of aluminum disk 1 having an outside diameter of 5.25 inches, and was thereafter polished until its thickness was reduced to 10 μm to obtain a specular surface having an average roughness (Ra) of 2 nm or less and a maximum roughness (Rmax) of 5 nm or less measured with the tracer type surface roughness tester, thereby forming a base in the same manner as Example 1. An intermediate layer 3 of Cr having a thickness of 100 nm, a magnetic layer 4 of CoNi having a thickness of 50 nm and a protective layer 5 of C having a thickness of 40 nm were formed on this base by sputtering. In this comparative example, the surface of the protective layer 5 of C was polished to a depth of about 10 nm by pressing a buff impregnated with polishing abrasive grains thereagainst while rotating the disk, thereby forming grooves which extend circumferentially. The surface of the protective layer 5 of C thus obtained exhibited an average roughness (Ra) of 5 nm and a maximum roughness (Rmax) of 30 nm as measured with the tracer type surface roughness tester. A lubricating layer 6 was thereafter formed on the protective layer 5 of C, thus manufacturing a magnetic disk 9.

The guaranteed minimum extent of floating of the head 13 from the magnetic disk 9 manufactured in accordance with this comparative example was 0.09 m or smaller, and the magnetic disk was poor in floating stability and could not be applied to a magnetic disk apparatus operating at a floating extent of 0.08 μm. As a result of the CSS test of the magnetic disk 9 manufactured in accordance with this comparative example, which test was performed by using the apparatus of FIG. 6, the disk surface was damaged during 30,000 CSS cycles. The sliding reliability of this magnetic disk was thus unsatisfactory. The guaranteed minimum floating extent of the head 13 was measured with respect to another magnetic disk 9 manufactured in the same manner and operated through 5,000 CSS cycles. The minimum floating extent thereby measured was only 0.14 μm. The floating surface of the head 13 was observed to find that a contamination which was not seen before the test operation and which was regarded as a cause of the deterioration of the floating characteristic was attached to the floating surface. It was thereby found that the magnetic disk 9 in accordance with this comparative example was incapable of maintaining the desired sliding reliability and head floating stability during long-term use.

COMPARATIVE EXAMPLE 3

A substrative layer 2 of NiP having a thickness of 15 μm was formed by electroless plating on a surface of aluminum disk 1 having an outside diameter of 5.25 inches, and was thereafter polished until its thickness was reduced to 10 μm to obtain a specular surface having an average roughness (Ra) of 2 nm or less and a maximum roughness (Rmax) of 5 nm or less measured with the tracer type surface roughness tester, thereby forming a base in the same manner as Example 1. An intermediate layer 3 of Cr having a thickness of 100 nm, a magnetic layer 4 of CoNi having a thickness of 50 nm and a protective layer 5 of C having a thickness of 60 nm were formed on this base by sputtering. In this comparative example, the protective layer 5 of C was etched to a depth of 30 nm under conditions that no particles were attached to the surface of the protective layer 5 of C, and that the power at the time of reverse sputtering was doubled in comparison with Example 1, and a lubricating layer 6 was thereafter formed on the protective layer 5, thus manufacturing a magnetic disk 9. A multiplicity of fine projections were formed on the surface of the protective layer 5 of C by the etching. The size of the projections was about 0.05 μm, the average height was 10 nm, the average distance between adjacent pairs of projections was about 0.4 μm, the number of projections per unit area was about 2.5×10⁷/mm², and the proportion of the total area of the projections was about 5%.

The guaranteed minimum extent of floating of the head 13 from the magnetic disk 9 manufactured in accordance with this comparative example was 0.06 μm or smaller, so that the magnetic disk could be applied to a magnetic disk apparatus operating at a floating extent of 0.08 μm. As a result of the CSS test of the magnetic disk 9 manufactured in accordance with this comparative example, which test was performed by using the apparatus of FIG. 6, the disk surface was damaged during 25,000 CSS cycles. The sliding reliability of this magnetic disk was thus unsatisfactory. The guaranteed minimum floating extent of the head 13 was measured with respect to another magnetic disk 9 manufactured in the same manner and operated through 20,000 CSS cycles. The minimum floating extent thereby measured was only 0.12 µm. The floating surface of the head 13 was observed to find that a contamination which was not seen before the test operation and which was regarded as a cause of the deterioration of the floating characteristic was attached to the floating surface. As can be understood from this result, the magnetic disk 9 of this comparative example on which very fine projections were formed at a high density was incapable of maintaining the desired sliding reliability and head floating stability during long-term use.

COMPARATIVE EXAMPLE 4

A substrative layer 2 of NiP having a thickness of 15 µm was formed by electroless plating on a surface of aluminum disk 1 having an outside diameter of 5.25 inches, and was thereafter polished until its thickness was reduced to 10 µm to obtain a specular surface having an average roughness (Ra) of 2 nm or less and a maximum roughness (Rmax) of 5 nm or less measured with the tracer type surface roughness tester, thereby forming a base in the same manner as Example 1. An intermediate layer 3 of Cr having a thickness of 100 nm, a magnetic layer 4 of CONi having a thickness of 50 nm and a protective layer 5 of C having a thickness of 30 nm were formed on this base by sputtering. Lands were formed on the surface of the protective layer 5 of C by the following process.

A suspension was prepared by ultrasonically dispersing 1% by weight of particles 8 of polytetrafluoroethylene (PTFE) having an average particle size of 50 µm in a fluorine solvent, and PTFE particles 8 were dispersively attached to the surface of the protective layer 5 of C in the same manner as Example 1. The state of attachment of PTFE particles 8 was observed with the optical microscope and it was thereby found that 90% or more of the total number of attached particles 8 had a size of 40 to 60 µm, the average distance between particles 8 was about 150 µm, the number of particles 8 per unit area was about 25/mm$^2$, and the proportion of the total area of surface portions covered with particles 8 was about 5%. This disk was processed by the sputtering apparatus in a reverse sputtering manner, as in the case of Example 1, so that the protective layer 5 of C was etched to a depth of 15 nm. The etched surface was scrubbed with pure water to remove PTFE particles 8. The states of the surface before and after the etching were observed and it was thereby confirmed that lands 7 having substantially the same size as the attached particles were formed on the surface of the protective layer 5 of C. The average distance between lands 7 after the etching was about 150 µm, the number of lands 7 per unit area was about 25/mm$^2$, and the proportion of the total area of lands 7 was about 5%. The height of lands 7 was measured with the tracer type surface roughness tester and it was thereby confirmed that the height of each land 7 was about 15 nm.

A layer 6 of a perfluoropolyether lubricant having a thickness of about 5 nm was formed on the surface of the thus-formed disk by applying the material thereto, thereby completing a magnetic disk 9.

The guaranteed minimum extent of floating of the head 13 from the magnetic disk 9 manufactured in accordance with this comparative example was 0.06 µm or smaller, so that the magnetic disk could be applied to a magnetic disk apparatus operating at a floating extent of 0.08 µm. As a result of the CSS test of the magnetic disk 9 manufactured in accordance with this comparative example, which test was performed by using the apparatus of FIG. 6, the disk surface was damaged during 30,000 CSS cycles. The sliding reliability of this magnetic disk was thus unsatisfactory. The guaranteed minimum floating extent of the head 13 was measured with respect to another magnetic disk 9 manufactured in the same manner and operated through 20,000 CSS cycles. The minimum floating extent thereby measured was only 0.12 µm. The floating surface of the head 13 was observed to find that a contamination which was not seen before the test operation and which was regarded as a cause of the deterioration of the floating characteristic was attached to the floating surface. As can be understood from this result, the magnetic disk 9 of this comparative example on which large lands 7 were sparsely formed was incapable of maintaining the desired sliding reliability and head floating stability during long-term use.

To further examine the effect of removing contaminants attached to the floating surface during floating of the head in a steady state with respect to the magnetic disks 9 in accordance with the examples of the present invention and the comparative examples, magnetic disks 9 in accordance with Examples 1 to 3 and Comparative Examples 1 to 4 were further manufactured to undergo an accelerated test conducted by using the apparatus of FIG. 7 and introducing atmospheric dust. The amounts of contaminants thereby attached to the disks were relatively evaluated with respect to the attachment area. When compared with the amount of contaminants attached to the floating surface facing the magnetic disk of Comparative Example 1 which was assumed to be 100, the amount of contaminants attached to each of Examples 1 to 3 was 2 or smaller. It was thereby found that the disk in accordance with the present invention had an improved contamination preventing effect. The amount of attached contaminants in the case of each of Comparative Examples 2 and 3 in which fine irregularities were formed on the disk surface at a high density was about 50 and smaller than that of Comparative Example 1 in which no irregularities were formed, but the improvement was insufficient in comparison with the present invention. The amount of attached contaminants in the case of Comparative Example 4 in which large lands were sparsely formed on the disk surface was about 40 and smaller than that of Comparative Example 1 in which no irregularities were formed, but the improvement was insufficient in comparison with the present invention.

What is claimed is:

1. A method of manufacturing a magnetic disk, comprising the steps of:

preparing a base;

forming a magnetic layer on at least one surface of the base;

forming a protective layer on the magnetic layer to obtain a semi-finished piece;

preparing a multiplicity of solid particles;

attaching the solid particles to at least a portion of a surface of the protective layer to form a mask thereon;

etching the surface of the protective layer through the mask to a depth not greater than the thickness of the protective layer; and removing the mask from the protective layer to obtain, on the surface of the protective layer, a multiplicity of lands having size- and distance-distributions and a substantially uniform height.

2. A method according to claim 1, wherein said solid particles are formed of one of a fluorine resin and a material containing at least fluorine and carbon; and wherein said solid particles are attached to the surface of the protective layer in a state wherein said solid particles are dispersed on the surface of said protective layer.

3. A method according to claim 1, wherein said etching step includes etching with a directionality such that the protective layer is etched in a direction generally perpendicular to the surface thereof.

4. A method according to claim 1, wherein said step of preparing solid particles includes:

preparing a suspension formed of a liquid and a multiplicity of solid particles dispersed in the liquid; and wherein said attaching step includes:

spin-coating the surface of the protective layer with the suspension; and attaching the multiplicity of solid particles to the surface of the protective layer in a state wherein the solid particles are dispersed on the surface of the protective layer by evaporating the liquid.

5. A method according to claim 1, wherein said step of preparing solid particles includes:

preparing a suspension formed of a liquid and a multiplicity of solid particles dispersed in the liquid; and wherein said attaching step includes:

immersing the semi-finished piece in the suspension; and pulling the semi-finished piece out of the suspension and evaporating the liquid from the surface of the protective layer to attach the multiplicity of solid particles to the surface of the protective layer in a state wherein the particles are dispersed on the surface of the protective layer.

6. A method according to claim 1, wherein said step of preparing solid particles includes:

preparing a suspension formed of a liquid and a multiplicity of solid particles dispersed in the liquid; and wherein said attaching step includes:

spraying the suspension on the surface of the protective layer; and evaporating the liquid from the surface of the protective layer to attach the multiplicity of solid particles to the surface of the protective layer in a state wherein the solid particles are dispersed on the surface of the protective layer.

7. A method according to claim 1, wherein said attaching step includes attaching the multiplicity of solid particles directly to the surface of the protective layer in a state wherein the solid particles are dispersed on the surface of the protective layer by transporting the solid particles with a gas.

8. A method according to claim 1, further including the step of, after formation of the lands on the protective layer, forming a lubricant layer on the protective layer, the lubricant layer having a thickness not greater than the height of the lands.

9. A method according to claim 2, wherein the solid particles are formed of one of polytetrafluoroethylene PTFE and derivatives thereof.

10. A method according to claim 1, wherein the solid particles are formed of an inorganic material.

11. A magnetic disk manufactured by the method according to claim 1.

12. A magnetic disk according to claim 11, wherein the lands have a substantially uniform height ranging from 5 to 40 nm, the size of the lands is distributed so that some of the lands having a size ranging from 0.1 to 30 µm in equivalent diameter occupy 80% or more of the total number of lands, and the number of the lands per unit area of the surface of the protective layer ranges from 50 to $2.5 \times 10^5/mm^2$.

13. A method of manufacturing a magnetic disk, comprising the steps of:

preparing a base;

forming a magnetic layer on at least one surface of the base;

forming a protective layer on the magnetic layer; and forming a multiplicity of lands in at least one region of a surface of the protective layer so that the multiplicity of lands have a substantially uniform height and have size- and distance-distributions within predetermined ranges;

wherein the lands have a substantially uniform height ranging from 5 to 40 nm, the size of the lands is distributed so that some of the lands having a size ranging from 0.1 to 30 µm in equivalent diameter occupy 80% or more of the total number of the lands, and the number of the lands per unit area in the region ranges from 50 to $2.5 \times 10^5/mm^2$; and wherein the step of forming the multiplicity of lands includes:

attaching a multiplicity of solid particles to at least a portion of a surface of the protective layer to form a mask thereon;

etching the surface of the protective layer through the mask to a depth not greater than the thickness of the protective layer; and removing the mask from the protective layer to obtain the multiplicity of lands on the surface of the protective layer.

14. A method of manufacturing a magnetic disk, comprising the steps of:

preparing a base;

forming a magnetic layer on at least one surface of the base;

forming a protective layer on the magnetic layer to obtain a semi-finished piece;

preparing a suspension in which solid particles are dispersed in a liquid;

spraying the suspension;

evaporating the liquid;

attaching the solid particles to at least a part of the surface of the protective layer to form a mask of the solid particles;

etching the surface of the protective layer through the mask to a depth not greater than the thickness of the protective layer; and removing the mask from the protective layer to obtain, on the surface of the protective layer, a multiplicity of lands having size- and distance-distributions and a substantially uniform height.

15. A method according to claim 14, further including the step of, after the formation of the lands on the protective layer, forming a lubricant layer on the protective layer, the lubricant layer having a thickness not greater than the height of the lands.

16. A magnetic disk manufactured by the method according to claim 14.

17. A method of manufacturing a magnetic disk, comprising the steps of:

preparing a base;

forming a magnetic layer on at least one surface of the base;

forming a protective layer on the magnetic layer to obtain a semi-finished piece;

attaching solid particles to at least a part of a surface of the protective layer to form a mask thereon, the sizes of the solid particles being distributed such that solid particles having a size ranging from 0.1 to 30 μm in equivalent diameter occupy 80% or more of the total number of the solid particles;

etching the surface of the protective layer through the mask to a depth not greater than the thickness of the protective layer; and removing the mask from the protective layer to obtain, on the surface of the protective layer, a multiplicity of lands having size- and distance-distributions and a substantially uniform height.

18. A method according to claim 17, wherein the number of the thus attached solid particles per unit area of the surface of the protective layer ranges from 50 to $2.5 \times 10^5$/mm$^2$.

19. A method according to claim 17, wherein the depth to which the etching is effected ranges from 5 to 40 nm.

20. A method according to claim 17, further including the step of, after the formation of the lands on the protective layer, forming a lubricant layer on the protective layer, the lubricant layer having a thickness not greater than the height of the lands.

21. A magnetic disk manufactured by the method according to claim 17.

* * * * *